J. L. SUSSMAN.
WELDED TUBE.
APPLICATION FILED FEB. 25, 1919.
1,332,932. Patented Mar. 9, 1920.
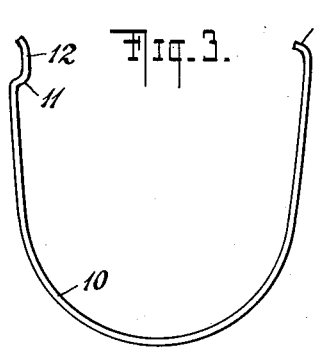
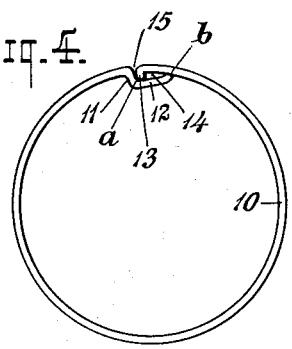
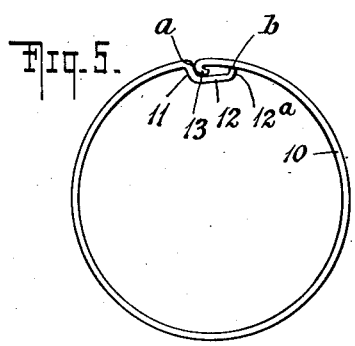
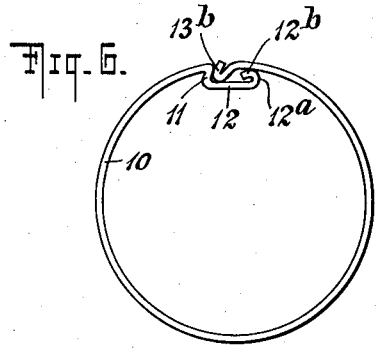
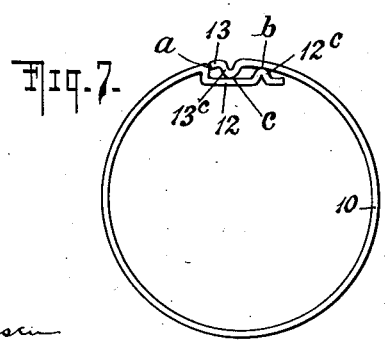
WITNESSES
INVENTOR
Julius L. Sussman
BY
ATTORNEYS

UNITED STATES PATENT OFFICE.

JULIUS L. SUSSMAN, OF NEW YORK, N. Y.

WELDED TUBE.

1,332,932.  Specification of Letters Patent.  Patented Mar. 9, 1920.

Application filed February 25, 1919. Serial No. 279,106.

*To all whom it may concern:*

Be it known that I, JULIUS L. SUSSMAN, a citizen of the United States, and resident of the city of New York, county and State of New York, have invented certain new and useful Improvements in Welded Tubes, of which the following is a specification.

My invention relates to welded tubes and other elements, and has for its object to perfect and strengthen the weld and to provide a welded tube or other element having the outward appearance of seamless tubing or other element. Other more specific objects of my invention will appear from the description hereinafter and the features of novelty will be pointed out in the appended claims.

In the accompanying drawings, Figures 1, 2 and 3 are views illustrating diagrammatically the forming of one example of my improved tube from the flat metal and Figs. 4, 5, 6 and 7 are sectional views of the tubes illustrating several examples of my invention.

For the purpose of describing the invention, I have chosen the example shown in Fig. 4. In constructing the tube in this form the blank 10 is off-set along one of its edges to form a shoulder 11 and a flange 12; the opposite edge of the blank is shaped to form a lip 13 as shown in Fig. 2. The blank in this condition is progressively curved as shown in Figs. 3 and 4 to complete the tube, this being accomplished in any well known way and by means of any convenient mechanism. In the completed form of the tube the lip 13 engages the shoulder 11 and the free edge of the flange 12 contacts with the inner surface of the tube at a distance from the shoulder 11 and lip 13, the arrangement being such that an inclosed chamber 14 is formed; as shown in Fig. 4 the contact between the opposed edges is made along two lines, spaced from each other, the engagement between the lip 13 and shoulder 11 constituting one line $a$ and the engagement between the free edge of the flange 12 and the inside surface of said tube constituting the other line $b$. Owing to the fact that the lip 13 turns inwardly as shown in Fig. 4, a groove 15 is formed lengthwise of said tube, said inturned lip 13 at the same time providing sufficient metal at the proper point to fill said groove under the action of the welding heat as will be more fully set forth hereinafter.

The tube in the form shown in Fig. 4 may be passed over a mandrel or the like and under a pressure exerting mechanism in the presence of a welding heat, produced either electrically or otherwise as desired. Under the action of the welding heat the metal becomes fused along the lines $a$ and $b$, it being understood that pressure is concurrently applied in the proper directions to bring about a perfect union between the overlapping portions of the tubes along said lines $a$ and $b$. As the metal becomes softened under the action of the heat, the pressure will cause it to fill the groove 15, the surplus metal necessary to produce this result being provided by the inturned lip 13. The welding is preferably carried on so that a continuous weld along the lines $a$ and $b$ is produced, it being understood, however, that in some cases the welding may be in the nature of spot-welding at intervals, particularly along the line $b$.

In any case, the areas in which the welding takes place are defined by the lines of engagement $a$ and $b$ between the overlapping tube portions, and are therefore fixed and definite and at the same time are reduced to minimum dimensions. Because of the relatively smaller mass of metal, the free edge of the flange 12 and the lip 13 will fuse long before the larger mass of metal in the remainder of the flange 12 and in that portion of the tube 10 contiguous to the lip 13 begins to fuse; the speed of welding is thereby greatly increased and the weld is always positive and of maximum strength and efficiency. At the same time, all visible evidence of the connections are obliterated and an autogenous, smooth weld results giving the finished tube the outward appearance of a seamless, drawn tube.

In Fig. 5 the free edge of the flange 12 is provided with a definite peripheral flange $12^a$ which engages the interior surface of the tube 10 along the line $b$; in this form the lip 13 is curved to a greater extent than in Fig. 4, as indicated at $13^a$.

In Fig. 6 the peripheral flange $12^a$ has its edge turned to form a bead $12^b$ and the lip 13 is turned back upon itself to form an additional member 13$^b$ in order to provide a greater quantity of surplus metal to fill up the seam and groove 15.

In Fig. 7 the flange 12 is shaped to form an intermediate outwardly projecting bead 12$^c$ and the lip 13 is formed with an inwardly extending bead 13$^c$. In this form the free edge of the lip 13 contacts with the shoulder 11 along the line $a$ and the bead 12$^c$ of the flange 12 engages the inner surface of the tube along the line $b$; in addition the bead 13$^c$ contacts with the flange 12 along a line $c$ at a point between the bead 13$^c$. In this form there are thus three definite spaced lines of contact between the overlapping opposed edges of the tube.

All of the above forms possess the advantages set forth with respect to the form first described.

It will be understood, in the case of tubes and the like, that the arrangements shown and described may be reversed, in order to provide a smooth interior surface, instead of a smooth exterior surface as in the illustrated examples.

With my improvement the two overlapping metallic members, represented in the illustrated example by the overlapping edges of the tube 10, are in engagement with each other only along a plurality of lines spaced from each other and a double weld is always effected along two distinct lines spaced from each other and in some cases additional welds along additional lines are effected; the result, in whatever form the invention may be, is an element, such as for instance a tube, which is at least as strong at the seam as it is in any other part, whereby the factor of safety is increased to a maximum extent. That is to say, by welding along different lines, each of which is separate and distinct from the other, the possibility of securing a faulty connection is reduced to a minimum; at least one of the welds is likely always to form a perfect connection even though one or more of the others should happen to be imperfect.

By filling the seam with the metal as hereinbefore described and by coincidentally applying pressure, for instance by means of a shoe or a roll, such irregularities as inevitably appear in welding are immediately obliterated. The necessity of smoothing and finishing of the joint by grinding or polishing with the consequent thinning down of the metal is thus entirely done away with.

Furthermore by so shaping the tube or other element at points along or contiguous to the lines of contact as to provide surplus metal, which under the action of the welding heat becomes fused and fills the joint, no additional strip or wire is necessary to close the seam. In addition with my improved arrangement, in all of its forms, contact surfaces for electric welding are provided at least at two places, and in such a manner that the welding is effected with a minimum expenditure of current.

It will be understood that the blank may be bent or shaped to provide a tube of a cross-sectional form other than circular and further that my improvement is not restricted to the welding of tubes although it is particularly useful in said art. Thus, my invention may be efficiently utilized in connection with the production of tubes of all description, smoke stacks, flues, funnels, barrels, kegs, and other receptacles, doors, moldings and in many other ways where it is desired to weld two elements together.

In all of its forms the improvement is simple and efficient and at all times insures uniform and satisfactory results.

The various shoulders, flanges, etc., referred to hereinbefore may be formed prior to welding as herein described or they may be formed coincidentally therewith as the welding proceeds or in any other suitable way.

Various changes in the specific form shown and described may be made within the scope of the claims without departing from the spirit of my invention.

I claim:

1. The combination of metallic members overlapping each other and forming a joint by contacting, at said overlap, along a plurality of lines transversely spaced from each other, said members being welded together only along said spaced lines of contact and being out of engagement with each other between said lines of contact.

2. The combination of metallic members overlapping each other and forming a joint by contacting, at said overlap, along two lines transversely spaced from each other, said members being welded together only along said spaced lines of contact and being out of engagement with each other between said lines of contact.

3. The combination of a metallic member having a shoulder and an off-set portion contiguous thereto, a second metallic member overlapping said off-set portion and contacting with said shoulder, the free edge of said off-set portion contacting with said second member, said members being spaced apart at said overlap between said shoulder and said free edge and being welded together only along the spaced lines of contact.

4. A welded tube having its two opposed edge portions overlapping each other and contacting along a plurality of lines extending longitudinally of the tube at said overlap and transversely spaced from each other, said edge portions being welded together only along said spaced lines of contact.

5. A welded tube having a longitudinal shoulder and a longitudinal flange contiguous thereto, and an edge portion overlapping said flange and engaging said shoulder, the free edge of said flange engaging the inner surface of said edge portions whereby two longitudinal lines of contact spaced from each other are formed, said tube being welded only along said lines of contact.

6. A welded tube having a longitudinal shoulder and a longitudinal flange contiguous thereto, and an edge portion overlapping said flange and engaging said shoulder, and forming therewith a groove, the free edge of said flange engaging the inner surface of said edge portion whereby two longitudinal lines of contact, spaced from each other, are formed, said tube being welded only along said lines of contact, and the fused metal filling said groove.

7. A welded tube having a longitudinal shoulder, a longitudinal off-set flange contiguous thereto, a peripheral flange on said longitudinal flange, and an edge portion of said tube overlapping and spaced from said longitudinal flange and engaging said peripheral flange, said edge portion engaging said shoulder whereby two longitudinal, spaced lines of contact are formed, said tube being welded only along said lines of contact.

8. A welded tube having a longitudinal shoulder, a longitudinal off-set flange contiguous thereto, a beaded peripheral flange on said longitudinal flange, an edge portion of said tube overlapping and spaced from said longitudinal flange and engaging the bead of said peripheral flange, and a lip at the free edge of said edge portion turned back upon itself and engaging said shoulder, whereby two longitudinal, spaced lines of contact are formed, said tube being welded together only along said lines of contact.

9. A welded tube, having a longitudinal shoulder, a longitudinal off-set flange contiguous thereto, a longitudinal bead located on said flange at an intermediate point, an edge portion of said tube overlapping and spaced from said flange and engaging said bead, the free edge of said edge portion engaging said shoulder and a longitudinal bead on said edge portion engaging said flange between its bead and said shoulder, whereby three longitudinal, spaced lines of contact are formed, said tube being welded only along said lines of contact.

10. The process of welding to form a joint which consists in overlapping two metallic members and bringing them into contact with each other along two lines transversely spaced from each other at said overlap and welding said members together only along said spaced lines of contact while leaving them out of engagement with each other between said lines of contact.

11. The process of welding tubes which consists in forming an edge portion of the tube with a longitudinal shoulder and an off-set flange contiguous thereto, lapping the other edge portion of said tube over said flange and into contact with said shoulder, and with the free edge of said flange to form transversely spaced lines of contact at said overlap and welding said edge portions together only along said spaced lines of contact.

In testimony whereof I have hereunto set my hand.

JULIUS L. SUSSMAN.